Patented Sept. 11, 1928.

1,684,330

UNITED STATES PATENT OFFICE.

OTTO SIEBERT, OF DESSAU, KARL THIESS, OF HOCHST-ON-THE-MAIN, BERNHARD SCHÖNER, OF WOLFEN, NEAR BITTERFELD, ROBERT SCHMIDLIN, OF HOCHST-ON-THE-MAIN, WALTHER BENADE, OF DESSAU, AND BERNHARD DEICKE, OF HOCHST-ON-THE-MAIN, GERMANY, ASSIGNORS TO GRASSELLI DYESTUFF CORPORATION, OF NEW YORK, N. Y., A CORPORATION OF DELAWARE.

WATER-SOLUBLE DYESTUFF AND PROCESS OF PRODUCING SAME.

No Drawing. Application filed June 17, 1926, Serial No. 116,706, and in Germany May 5, 1923.

The present invention relates to water-soluble dyestuffs of the general formula:

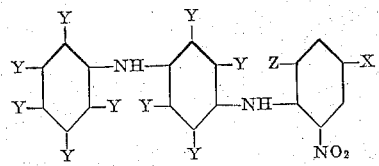

wherein X represents hydrogen or the sulfonic acid group, Z hydrogen or the nitro group, and Y hydrogen, the nitro-, alkyl-, or sulfonic acid group.

Our new dyestuffs are obtainable, for instance, by causing a 4-aminodiphenylamine compound to act upon a compound of the general formula:

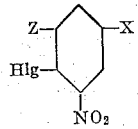

wherein X represents hydrogen or the sulfonic acid group, Z hydrogen or the nitro group, and Hlg an exchangeable halogen. Our new compounds are similar to the water-soluble dyestuffs described in the U. S. Patent 1,059,571. However, they dye wool faster and more even tints than the dyestuffs described in the above-mentioned patent. They are also suitable for the dyeing of leather.

The following examples serve to illustrate our invention, all parts being by weight:

1. 30.9 parts of 4-nitro-4'-aminodiphenylamine-2-sulfonic acid are dissolved in 300 parts of water by adding thereto sodium carbonate; there are then further added 8.2 parts of sodium acetate, 15.7 parts of 2-nitro-1-chlorobenzene, some alcohol and very little copper bronze and the mixture is kept for several hours at the boiling point. The solution, which soon forms, assumes a deeper color. After having filtered hot, the new condensation product crystallizes out on cooling partly in the form of its sodium salt and on addition of common salt further separation takes place. As free acid, the dyestuff constitutes a yellow crystalline powder and dyes wool in an acid bath neutral-yellow eminently even tints of thoroughly good fastness. Its fastness to light is excellent.

The dyestuff corresponds with the following graphical formula:

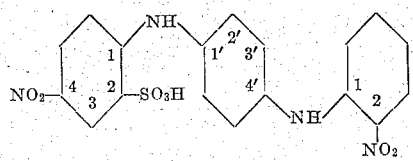

2. By condensing according to the method laid down in Example 1 one molecule of 2-nitro-4'-aminodiphenylamine-4-sulfonic acid with one molecule of 1-chloro-2-nitrobenzene-4-sulfonic acid, a dyestuff yielding a clear yellowish-brown tint of very good fastness to light, to washing and to the action of alkalies is produced, corresponding with the following graphical formula:

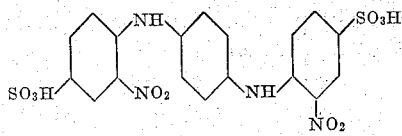

3. 320 parts of potassium-1-chloro-2,6-dinitrobenzene-4-sulfonate (one molecule) are boiled for several hours in 3000 parts of water with 26.4 parts of 4-aminodiphenylamine-2-sulfonic acid (one molecule) while adding the required quantity of sodium acetate. The resulting product is worked up as indicated in Example 1. The dyestuff thus obtained forms a deep brown powder and dyes wool fast brown tints, which are remarkable for their extremely good fastness to washing. The dyestuff corresponds with the following graphical formula:

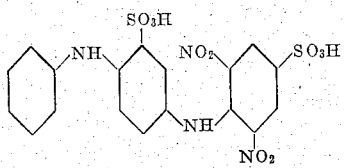

4. 28.6 parts of sodium-4-aminodiphenylamine-2-sulfonate dissolved in 1000 parts of water are heated, while stirring, with 20.3 parts of 2,6-dinitro-1-chlorobenzene to 100° C. during which operation there are run in within 4 hours 5.5 parts of sodium carbonate in form of a solution of 10% strength. The resulting solution is filtered while hot, the dyestuff after being salted out is separated by pressing and dried. It dyes wool in an acid bath a red-brown tint. The dyestuff corresponds with the following formula:

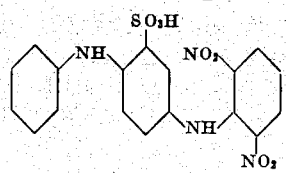

5. 18.4 parts of 4-aminodiphenylamine are dissolved together with 12 parts of concentrated hydrochloric acid in 400 parts of water. There is then added a solution of 30.5 parts of sodium-2.6-dinitro-1-chlorobenzene-4-sulfonate; to this mixture, after being heated to 95° C., is added with stirring a solution of 14 parts of crystallized sodium acetate. After having stirred the mass for 6 hours it is neutralized by means of sodium carbonate. On cooling the resulting dyestuff crystallizes out. The shade of its dyeings resembles that obtainable by the dyestuff produced according to Example 4. The dyestuff corresponds to the following graphical formula:

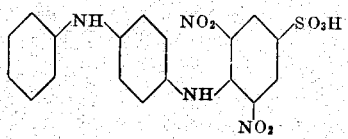

We claim:

1. As new products water-soluble dyestuffs of the general formula:

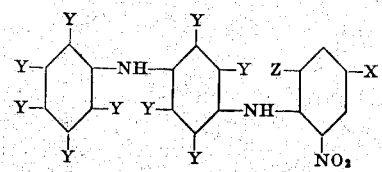

wherein X represents hydrogen or the sulfonic acid group, Z hydrogen or the nitro group, and Y the hydrogen-, nitro-, alkyl-, or sulfonic acid group.

2. As new products water-soluble dyestuffs of the general formula:

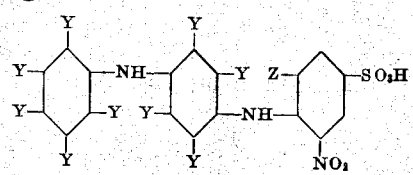

wherein Y represents hydrogen-, nitro-, alkyl-, or sulfonic acid group, and Z hydrogen or the nitro group.

3. As new products water-soluble dyestuffs of the general formula:

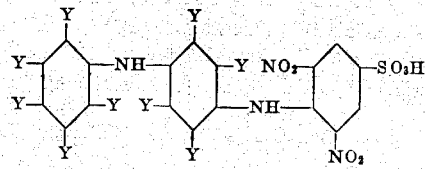

wherein Y represents hydrogen-, nitro-, alkyl-, or sulfonic acid group.

4. As new products water-soluble dyestuffs of the general formula:

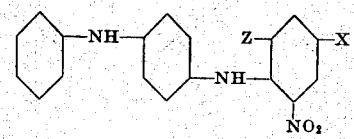

wherein X represents hydrogen or the sulfonic acid group, and Z hydrogen or the nitro group.

5. As new products water-soluble dyestuffs of the general formula:

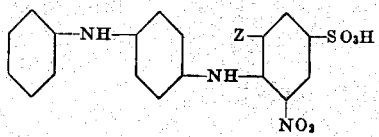

wherein Z represents hydrogen or the nitro group.

6. As a new product a water-soluble dyestuff of the general formula:

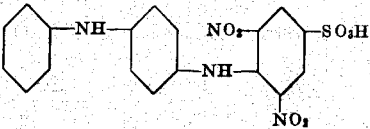

which dyes wool reddish-brown shades from an acid bath.

In testimony whereof, we affix our signatures.

OTTO SIEBERT.
KARL THIESS.
BERNHARD SCHÖNER.
ROBERT SCHMIDLIN.
WALTHER BENADE.
BERNHARD DEICKE.